United States Patent [19]

Patel

[11] 4,195,056
[45] Mar. 25, 1980

[54] VAPOR PERMEATION TIME-TEMPERATURE INDICATOR

[75] Inventor: Gordhanbhai N. Patel, Morris Plains, N.J.

[73] Assignee: Allied Chemical Corporation, Morris Township, Morris County, N.J.

[21] Appl. No.: 911,629

[22] Filed: Jun. 1, 1978

[51] Int. Cl.² ............................................ G01N 21/06
[52] U.S. Cl. ................................. 422/56; 23/230 R; 116/206; 422/58
[58] Field of Search ................. 23/230 R; 422/56, 57, 422/58; 116/114 AM, 114 V; 73/358

[56] References Cited

U.S. PATENT DOCUMENTS

| | | | |
|---|---|---|---|
| 2,560,537 | 7/1951 | Anderson . | |
| 3,118,774 | 1/1964 | Davidson et al. . | |
| 3,243,303 | 3/1966 | Johnson . | |
| 3,414,415 | 12/1968 | Broad, Jr. . | |
| 3,501,297 | 3/1970 | Cremeans | 96/48 |
| 3,615,719 | 10/1971 | Michel et al. | 73/358 |
| 3,768,976 | 10/1973 | Hu et al. | 116/114 V |
| 3,844,718 | 10/1974 | Cohen | 23/253 TP |
| 3,954,011 | 5/1976 | Manske | 116/114 V |
| 3,981,683 | 9/1976 | Larsson | 116/114 V |
| 3,999,946 | 12/1976 | Patel et al. | 23/253 TP |
| 4,042,336 | 8/1977 | Larsson | 23/253 TP |

OTHER PUBLICATIONS

Wegner, Zeitschrift fur Naturfurschung vol. 24b, pp. 824-832 (1969).

*Primary Examiner*—R. E. Serwin
*Attorney, Agent, or Firm*—Robert J. North; Gerhard H. Fuchs

[57] ABSTRACT

A time-temperature indicator (t-T indicator) is described which is useful for monitoring the shelf lives of various perishable articles. The device is constructed of a vapor-permeable barrier positioned between a vapor and an indicator, both housed in a vapor-impermeable container. The device is activated just prior to the monitoring period by providing vapor to the container, as for example, by rupturing a solvent-filled frangible reservoir. The indicator, upon contact with the vapor produces a visual color response, and the vapor is constrained to permeate through the vapor-permeable barrier before contacting the indicator, thus creating a characteristic induction period before a color response occurs. The time required for the color response to occur in the device is a function of the temperature and time. The induction period can be varied by the thickness and type of material of construction used for the vapor-permeable barrier, the nature of the vapor and the nature of the indicator employed.

20 Claims, 6 Drawing Figures

VAPOR PERMEATION TIME-TEMPERATURE INDICATOR

BACKGROUND OF THE INVENTION

1. Field of the Invention

This invention relates to a device for monitoring time-temperature histories in which a vapor is allowed to contact an indicator to cause a color response, by permeating through a vapor-permeable barrier, whereby a color response occurs only after a definite characteristic induction period.

2. Brief Description of the Prior Art

A host of perishable products such as frozen foods, blood, vaccines and the like require a means for monitoring time-temperature shelf life histories.

Various indicators have been developed in the prior art to meet this need with varying success.

Indicators are known that use a liquid or liquid vapor for activating a color response indicating that a predetermined shelf life has expired. For example, U.S. Pat. No. 3,844,718 discloses a defrost indicator which is activated by contact of water vapor with a water-soluble ink supported on a hygroscopic substrate.

U.S. Pat. No. 3,768,976 discloses a t-T indicator that depends upon the rate of permeation of gaseous oxygen through a polymer envelope containing an aqueous solution of a red redox dye. Upon oxidation, the red dye turns colorless, indicating that the perishable has been exposed to too high a temperature for too long a time.

U.S. Pat. No. 3,615,719 discloses a temperature indicator in which a frozen liquid is separated from an indicating layer by a liquid-soluble barrier. When the frozen liquid thaws, a time delay is introduced by the rate of dissolution of the liquid soluble barrier. Only upon dissolution of this barrier does color indication occur.

U.S. Pat. No. 3,501,297 discloses a mixture of diacetylenes, irradiated by ultraviolet radiation producing a blue-bronze color, capable of being converted by contact with warm ethanol vapors to a red color. However, such a color change by itself, is insufficient to suggest its application as a practical time-temperature history indicator, since the color change may simply indicate that a particular temperature has been exceeded, without an indication either of the length of time that temperature has been exceeded or of the time-averaged exposure at higher temperatures.

There is a continuing need for improved indicators for monitoring the time-temperature histories of perishable products.

Known successful devices usually require either liquids or gases for initiation of the color response. A device requiring vapor would be relatively less expensive since less liquid would be required to activate the color response. However, it is known that contact between vapor and a solid, capable of undergoing a color response upon contact with said vapor, usually produces a color response almost immediately. The prior art does not suggest a device based solely on the interaction between a vapor and solid, in which a characteristic induction period prior to color development can be varied. Such a device could be effectively used for monitoring a range of time-temperature histories of perishable articles.

SUMMARY OF THE INVENTION

We have unexpectedly found that a characteristic induction period can be created prior to the occurrence of a color response in a device containing a solvent vapor which contacts an indicator to produce the color response by placing a barrier between the two elements, preferably a polymeric barrier, wherein the induction period can be varied by the polymer thickness, the polymeric material, and the nature of the vapor and indicator employed.

In accordance with this invention there is provided a device for monitoring the time-temperature history of an article comprising:

(a) a closed vapor-impermeable container;

(b) at least one vapor-permeable barrier within said container;

(c) vapor capable of permeating through the permeable barrier;

(d) means for providing vapor at a given moment to said container, said means positioned on one side of the barrier; and (e) at least one indicator, comprised of a solid deposited on a substrate, capable of exhibiting a visual color response upon contact with said vapor, said indicator positioned on the other side of the barrier, whereby the barrier creates an induction period between the moment the vapor is introduced to said container and the moment said indicator exhibits the color response.

Further provided is a process for monitoring the time-temperature history of an article comprising applying to the article the device of claim 1 and providing vapor to contact the vapor-permeable barrier at the beginning of the monitoring.

Also provided is an article having the device of claim 1 applied thereto.

In addition, there is provided a process for preparing the device of claim 1 comprising the step of enclosing in a vapor-impermeable container;

(a) a vapor-permeable barrier;

(b) means for providing vapor at a given moment to the container, said means positioned on one side of the barrier; and, (c) an indicator, comprised of a solid deposited on a substrate, capable of exhibiting a visual color response upon contact with said vapor, said indicator positioned on the other side of the barrier, whereby the barrier creates an induction period between the moment the vapor is introduced to said container and the moment said indicator exhibits a color response.

DESCRIPTION OF THE INVENTION AND PREFERRED EMBODIMENTS

Figure 1:
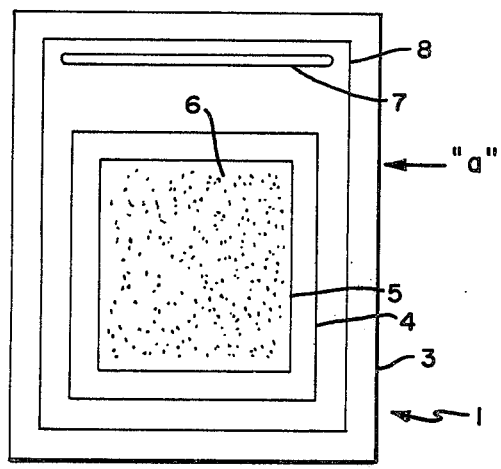
FIG. 1 is an illustration of the top view of the device containing one indicator tab and a solvent reservoir located at one end of the enclosed envelope.
Figure 2:
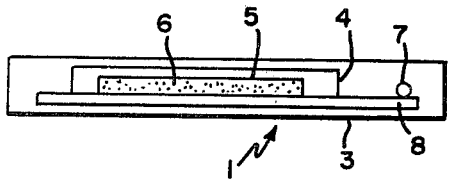
FIG. 2 is a cross-sectional side view of the above device in FIG. 1, as viewed from reference point "a".

A description of the basic invention device and a preferred embodiment, can be readily made by reference to FIG. 1 and FIG. 2. The device 1, a preferred embodiment (containing one indicator) comprises a vapor-impermeable container 3, the housing for the device, which can have an adhesive backing (not shown) for example, for attachment to an article or to a wall or surface in the area in which the article is stored, in which is contained absorptive support 8 which acts as a support for solvent reservoir 7, and sealed indicator tab comprising a compartment formed of barrier 4 enclosing indicator 5, upon which is deposited indicating solid 6. The assembly, comprising a substrate and deposited indicating solid, is herein referred to as an "indicating tab", and when enclosed in barrier polymer 4 to form a compartment, is referred to as a "sealed indicator tab". At the beginning of the monitoring period, solvent reservoir 7, being frangible in this preferred embodiment, is ruptured, by for example, by using hand pressure, thus releasing solvent which is constrained to move within vapor-impermeable container 3 and absorbed by absorptive support 8, having an affinity for the liquid solvent. Vapor forms via solvent volatilization from support 8. Formed vapor occupies the inside of container 3 and then permeates through vapor-permeable barrier 4, usually being a polymeric material, at a rate which is a function of the temperature. In this embodiment, the vapor-permeable barrier forms an enclosed compartment containing the indicator tab. After sufficient vapor has permeated through the barrier into the enclosed compartment, the amount of which is primarily dictated by the nature of the solvent, to substantially contact the exposed surface of indicating solid 6, a visual color response, such as a color change from blue to red, occurs over the entire exposed surface of the indicator substantially simultaneously.

Knowledge of the time required, from the start of the monitoring period taken as the moment solvent is released to the container, to reach the end of the monitoring period, taken as the substantially simultaneous color response of the entire exposed surface area, reveals the average integrated temperature during the monitoring period.

Knowledge of the average or integrated temperature of the monitoring period will determine the elapsed time required for development of the entire color response. A particular indicating solid/barrier/vapor system will possess a characteristic induction period (that is a function of the temperature) which will be known and used in a particular situation.

Figure 3:
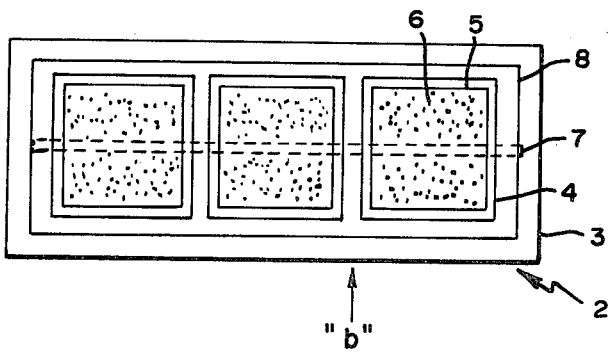
FIG. 3 is an illustration of the top view of the device containing three indicator tabs wherein the solvent reservoir is positioned below the indicator tabs in the enclosed envelope.
Figure 4:
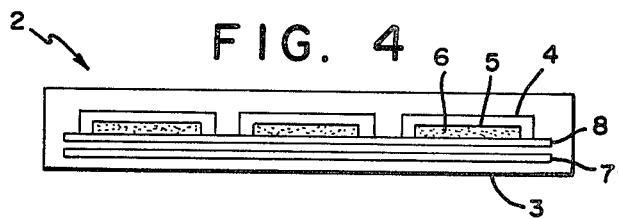
FIG. 4 is a cross-sectional side view of the above device in FIG. 3, as viewed from reference point "b".

Device 2, another preferred embodiment illustrated in FIG. 3, a top view, and FIG. 4, a cross-sectional side view, contains a plurality (here three) of indicators sealed in barrier material 4, forming sealed indicator tabs. Items 3-8 are the same as described for device 1. As described above for device 1, the barrier material, used for each indicator is preferably a polymeric material, and can be the same material or different and the same thickness, permeability or different. Preferably, the overall permeability of each sealed indicator tab is different, resulting in different induction periods, thus providing a range of monitoring conditions for different time-temperature histories in one device.

Figure 5:
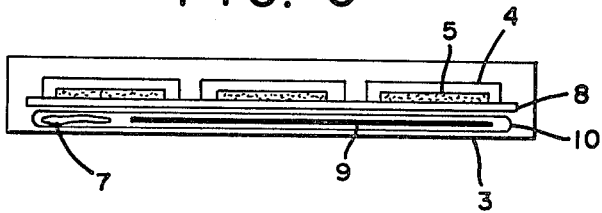
FIG. 5 is a cross-sectional side view of a modification of the device in FIG. 3 wherein the solvent reservoir is contained within solvent container 11.

FIG. 5 is a cross-sectional side view of a further modification of the preferred basic device in which solvent reservoir 7 is enclosed in a vapor-permeable non-frangible solvent container 10. In this modification, released solvent, from the rupture or solvent reservoir 7, is absorbed by solvent absorptive support 9 and vapor is formed by subsequent evaporation. Formed vapor is then constrained to permeate through container 10 prior to travel to a sealed indicator tab. By utilizing a solvent container, the overall induction period of the device can be considerably lengthened. Alternately, if the solvent container is used, the indicator need not be sealed by barrier material 4, since formed vapor is constrained to permeate through the solvent container, formed from barrier material 4, before contacting said indicator tab.

The device of this invention can be used for monitoring the time-temperature histories of perishable products over a temperature range of about $-70°$ to $+150°$ C. and from times ranging from about one minute to 2 years, depending on the choice of vapor, indicator and barrier materials, which will be obvious to one skilled in the art from the disclosure herein.

The function of the barrier is to create a characteristic "induction period" and "total lifetime" for a particular vapor/barrier/indicator system, such that the time required for color response to occur, after release of vapor to the system, can be predictably controlled as a function of temperature. The term "induction period" as herein used, refers to the threshold time required for the indicator to evidence a noticeable visual color response following release of vapor to the system. The term "total lifetime" as used herein, refers to the total time, following release of vapor to the system, required for the color response to attain the final value.

The barrier in the device must be positioned between the vapor and indicator such that the vapor is constrained to permeate through the barrier prior to contacting the indicator, such that the color response does not occur simultaneously with release of vapor to the system. In addition, the barrier must be measurably permeable to said vapor and must not be dissolved by said vapor during the monitoring period. However, a slight swelling affect of the barrier material may occur during the monitoring, and may be tolerated provided a characteristic induction period can be obtained. The barrier material may be any vapor-permeable material which is not significantly soluble in the condensed vapor and creates a measurable induction period. Such materials include natural polymers such as leather and synthetic polymers. Preferably, the barrier is constructed of a vapor-permeable synthetic polymer. Representative examples of useful barrier polymers include cellophane, cellulose acetate, polycarbonate, polyethylene, polypropylene, nylon-6, nylon-66, nylon-610, polyacrylonitrile, acrylonitrile/butadiene copolymer, acrylonitrile/styrene copolymer, acrylonitrile/methyl methacrylate copolymer, acrylonitrile/methyl methacrylate/styrene copolymer, polystyrene, polyvinyl alcohol, polyoxymethylene, polyvinyl fluoride, polyvinylidene chloride, polytrifluorochloroethylene, polymethylmethacrylate, poly(4-methylpentene-1), polyethylene/polypropylene copolymer, polyethylene terephthalate, polyphenylene terephthalate, and equivalent copolymers, grafted polymers or mixtures thereof. Preferred polymers for constructing the barrier are polyethylene, preferably low density polyethylene, nylon and polycarbonate.

The position of the barrier in the device must be such that vapor is constrained to permeate through the barrier before contacting the indicator. This can be accomplished in the device in a variety of ways including: enclosing the indicator tab in a sealed compartment of barrier material; enclosing the solvent reservoir in an enclosed compartment of barrier material; enclosing both the indicator tab and solvent reservoir in barrier material; or, simply separating the vapor from the indicator in the device by a wall of barrier material, thus forming two enclosed portions of the container. In general, it is preferred to enclose the indicator tab in barrier material, thus forming an enclosed compartment.

The characteristic induction period of the device, is primarily affected by two factors, the thickness and permeability of the barrier material.

The thickness and size of the barrier material to be employed will of course depend upon other factors as well, but usually a thickness of about 1 to 6 mils will provide excellent results for the monitoring process, with thicker sheets of barrier material resulting in longer induction periods and total lifetimes.

The permeability of the barrier material will depend strongly upon the nature of the material, discussed hereinabove, and in the case of polymeric materials, upon the crystallinity. In general, the higher the crystallinity of polymeric material, the lower the permeability of the barrier material to a particular vapor.

In certain situations, where it is desired to monitor the time-temperature history of an article such that the device designates when fractional portions of the time-temperature history have been reached, it is preferred to utilize the device having a plurality of indicators, as indicated in FIG. 3, for device 2. In such a device, the same vapor is usually utilized to activate each indicator, but the barrier material, its thickness, or the indicating solid may be different. For example, acetone may be the vapor, one indicating tab may be partially polymerized HDDnBU, 2,4-hexadiyn-1,6-diol bis(n-butylurethane), enclosed in 3.5 mil polyethylene; a second indicating tab may be HDDmTU, 2,4-hexadiyn-1,6-diol bis(m-tolylurethane), enclosed in 3.5 mil polyethylene; and the third may be 4DBCMU, 5,7-dodecadiyn-1,12-diol bis(butoxycarbonylmethylurethane) enclosed in 3 mil polypropylene. Contacting each sealed indicator tab with acetone vapor will produce color responses in different time intervals. By choosing the indicator with the longest induction period and total lifetime to match the total time-temperature history of the article to be monitored, the other indicators will have shorter induction periods and will thus provide color responses when fractional portions of the total time-temperature history have expired.

The container of the device is a closed vapor-impermeable structure housing the vapor, barrier and indicator of the device. The container being closed, operates to contain and prevent any vapor from escaping out of the device and also to provide an observable view of the indicator tab during the monitoring period. Representative examples of suitable materials for constructing the container include polyesters, such as polyethylene terephthalate, polyamides, such as nylon 66 and polyacrylonitrile. A preferred material is nylon 66.

The size and design of the container can be varied to suit the particular article to be monitored. A limitation on the size of the device is that it must be large enough to exhibit an observable color response under the conditions of monitoring.

The indicator of the device comprised of a solid deposited on a substrate, must be capable of exhibiting a visual color response upon contacting a vapor, and must be positioned in the device on the other side of the barrier from the vapor. Upon contact with said vapor, the indicator undergoes a color response, preferably a color change, over its entire exposed surface substantially simultaneously, such that the color response is essentially uniform and no localized moving colored boundaries are present. The reason as to why the indicator, containing an indicating solid, undergoes a color response upon contacting with said vapor is not clearly understood and may be due to a variety of mechanisms such as dissolution of a portion of the indicating solid by the vapor, a change in the crystallinity of the indicating solid, a change in the crystal structure of the indicating solid, formation of a vapor-solid complex, or the like. Regardless of the mechanism underlying the color response, the incorporation of a vapor-indicator combination into the device system is not specifically directed or predicted upon one particular mechanism, but is based generally upon the observed fact that an indicating solid is capable of undergoing a color response upon contact with a vapor.

The indicator comprises an indicating solid deposited on a substrate. The substrate can be any solid material which acts as a support for the solid during the monitoring process and in the simplest embodiment can be the surface of the barrier material or the surface of the container. It is preferred, however, to use a separate flexible support such as filter paper, or a polymeric material such as polyethylene, or the like. The indicating solid can be deposited on the substrate by means of contacting or spraying the substrate with a solution of the indicating solid and allowing the solvent to evaporate, or alternately, dispersing the indicating solid in a suitable binder medium such as shellac, varnish, lacquer, vinyl, epoxy, or acrylic, known materials in the art, and then applying the dispersed indicating solid to the substrate.

The indicating solid can be any solid material which undergoes a color response, i.e., a color change, upon contacting with said vapor. This includes a host of compounds including dyes, pigments and other colored or white solids which undergo a color change, or a change in opacity, as a response, upon contacting a vapor.

Representative examples of dyes and pigments include ethyl violet, malachite green, and the like. Also included are those dyes and pigments listed in the reference "The Chemistry of Synthetic Dyes and Pigments" by H. A. Lubs, Copyright 1955, Reinhold Publishing Co., ACS Monograph Series No. 127, which is hereby incorporated by reference.

A preferred class of indicating solids are diacetylene compounds, or mixtures thereof, wherein said compound contains at least one conjugated diyne group, i.e., $-C\equiv C-C\equiv C-$, per molecule. Diacetylene compounds are known in the art, including methods of preparation, and are adequately described in U.S. Pat. No. 3,999,499 (Patel et al. to Allied Chemical, 1976) which is hereby incorporated by reference. The diacetylene compounds contain at least one substituent typically selected from the group consisting of alkyl, aryl, sulfonate, urethane and alcohol derivatives and preferably the diacetylene contains at least one urethane substituent, and more preferably two urethane substituents. In a particularly preferred embodiment, the substituents are identical. Representative examples include those of the formula:

RNHCO—O—(CH$_2$)$_n$—C≡C—C≡C—(CH$_2$)$_m$—O—CONHR' where n and m can be the same or different and are at least 1; and wherein R and R' can be the same or different and are alkyl, substituted or unsubstituted aryl derivatives. Preferred diacetylenes useful in the instant invention include:

5,7-dodecadiyn-1,12-diol bis(n-butoxycarbonylmethylurethane), 4DBCMU,
5,7-dodecadiyn-1,12-diol bis(n-hexylurethane), 4DnHU,
5,7-dodecadiyn-1,12-diol bis(n-butylurethane), 4DnBU,
2,4-hexadiyn-1,6-diol bis(n-butylurethane), HDDnBU,
2,4-hexadiyn-1,6-diol bis(m-tolylurethane), HDDmTU,
2,4-hexadiyn-1,6-diol bis(o-methoxyphenylurethane), HDDoMPU,
2,4-hexadiyn-1,6-diol bis(p-chlorophenylurethane), HDDpCPU,
2,4-hexadiyn-1,6-diol bis(o-chlorophenylurethane), HDDoCPU, and
4,6-decadiyn-1,10-diol, DDD.

The diacetylene compound, or mixture thereof, can also be partially polymerized, for example, by solid state polymerization induced by thermal annealing, or high energy radiation such as ultraviolet, alpha-, beta-, electron- or gamma-radiation. Partially polymerized diacetylenes thus produced are usually blue. For example, HDDnBU, partially polymerized by exposure of the solid monomer to ultraviolet radiation for about 0.5–10 minutes, is a blue solid, containing about one weight percent polyacetylene derived from the monomer. Partially polymerized diacetylenes are generally an intimate mixture of monomer and polyacetylene approaching a solid solution, where the polyacetylene can be present in an amount of up to about 100% by weight and preferably 10% by of the total mixture. Other partially polymerized diacetylenes useful in the invention are derived for example from diacetylenes described above.

Some of the partially polymerized diacetylenes which are blue in color undergo a color response to a red color when contacted with certain vapors. For example, partially polymerized HDDnBU contacted with acetone vapor changes to a red color.

Polymeric materials, such as fully polymerized diacetylenes, which can also undergo a color response upon contact with a vapor are also included as indicating solids in the instant invention. An example of a fully polymerized diacetylene which can be used as indicating solid is poly[5,7-dodecadiyn-1,12-diol bis(butoxycarbonylmethylurethane)], poly-4DBCMU, which when contacted with chloroform vapor undergoes two color transitions: initially from metallic green-gold to red, and then from red to yellow.

Mixtures of solids, wherein each solid exhibits a characteristic color response upon contact with vapor, but wherein the mixture exhibits a combined different overall color response when contacted with vapor, are also a subject of this invention. For example, a colorless diacetylene such as HDDmTU, which undergoes a color response to a blue color upon contact with a vapor can be combined in simple mixture with a yellow dye or pigment. The initial yellow mixture upon contact with vapor will undergo to change to green, the addition color of the two subtractive primaries, yellow and blue. In a similar manner, other color responses can be created and generated from mixtures of two or more differently colored solids which will be obvious to one skilled in the art from this disclosure. Thus, the instant invention also includes a solid diacetylene compound and a solid selected from the group consisting of dyes, pigments, or mixtures thereof.

Some indicating solids have the property of being able to exhibit two color responses upon contacting with certain vapors. For example, metallic-colored poly-4DBCMU when contacted with chloroform vapor, undergoes a color response from metallic color to red, and then shortly thereafter, depending upon the temperature and the nature and thickness of the barrier, a color response from red- to -yellow. Both color responses can be utilized in monitoring time-temperature histories of perishable products. The reason the second color response occurs is not clearly understood but may be due to a partial solubility of polydiacetylene in the vapor of the formed color material after the first color response.

Further included among solids useful in the instant invention are those solids existing in an inactive form, not capable of undergoing a color response upon thermal annealing, but capable of undergoing conversion to an active form upon contacting with a vapor, said active form being capable of undergoing a color response upon thermal annealing. Novel inactive forms of such solids, and their methods of preparation, are described in U.S. application Ser. No. 938,174, which is hereby incorporated by reference. Representative examples of inactive forms include HDDmTU, HDDoMPU, HDDpCPU and HDDoCPU, or mixtures thereof, described above, which can be converted to the active forms in the device by contacting with p-dioxane, dimethylformamide, pyridine, or mixtures thereof.

Vapor in the present invention device is positioned such that it is constrained to permeate through the barrier before contacting the indicator. The vapor must be able to permeate through the barrier without significantly dissolving said barrier, and preferably the vapor in the condensed liquid state has a boiling point of at least about 25° C. at atmospheric pressure.

Representative examples of vapor useful in the instant invention include $C_3$–$C_6$ linear or branched acyclic alkyl ketones; halogenated $C_1$–$C_3$ alkanes, containing 1–4 halogen atoms being fluorine, chlorine, bromine, iodine or mixtures thereof; $C_3$–$C_6$ N,N-dialkylalkanoamides, wherein said alkyl groups may be the same or different and may be linear or branched; $C_1$–$C_3$ monohydric alkyl alcohols; $C_1$–$C_4$ saturated alkanoic monocarboxylic acids, wherein said alkane portions may be either linear or branched; $C_2$–$C_6$ alkyl sulfoxide and $C_2$–$C_6$ alkyl ethers, wherein said alkyl groups may be the same or different and may be linear or branched; cyclic $C_4$–$C_9$ alkyl ethers, said alkyl groups being either linear or branched; $C_7$–$C_9$ alkylphenols, said alkyl groups being either linear or branched and said phenol being either mono-, di- or trisubstituted; $C_5$–$C_{10}$ heterocyclic nitrogen compounds, containing up to 2 ring nitrogen atoms, and 1 or 2 aromatic rings, being fused or separated; phenol, water, equivalents of the above-recited compounds or mixtures thereof. Preferred vapors for use in the invention device are acetone, methyl ethyl ketone, dichloromethane, chloroform, carbon tetrachloride, dimethyl sulfoxide, dimethylformamide, dimethylacetamide, methanol, ethanol, aqueous ethanol mixtures including 50:50 and 25:75 ethanol:water volume percentages, isopropanol, acetic acid, water, p- dioxane, p-cresol, phenol, pyridine, equivalents or mixtures thereof.

Means for providing vapor to the container at the beginning of the monitoring process is positioned at the other side of the barrier from the indicator and is usually a frangible solvent reservoir. The reservoir being frangible, is easily ruptured as for example by hand pressure at the beginning of the monitoring period. The solvent is allowed to volatilize to form vapor, usually by wetting an absorptive support, e.g., a porous substrate, such as filter paper, which facilitates the evaporation process. The solvent reservoir can be constructed of a variety of materials with the proviso that the material is not significantly soluble in the solvent, but may be slightly swelled during the monitoring process. In one embodiment, the material is sufficiently non-permeable to the solvent such that escape of solvent to the container does not occur prior to the desired monitoring period, as illustrated in FIG. 1. Representative materials that can serve as the solvent reservoir include thin-walled glass, aluminum foil and frangible but vapor-impermeable plastics. A preferred material is thin-walled glass.

In another embodiment, as illustrated in FIG. 5, the solvent reservoir 7 is contained within non-frangible solvent container 10 along with solvent absorptive support 9. In this embodiment the solvent reservoir is frangible and is constructed from materials described above. The solvent container 10 is constructed from barrier material as described herein.

Absorptive support 8 and solvent absorptive support 9 usually are constructed of the same materials although they could be different depending upon the specific circumstances. The purpose of support 9 is to provide an absorbant surface from which vapor is easily formed in the solvent container. The purpose of support 8 is to support the solvent reservoir and/or the indicating tab, provide a background to make easier visual observation of the color response, and to provide a surface from which vapor can easily be formed. Representative examples of materials include filter paper, cotton, and absorptive tissue. Preferred material is filter paper.

A preferred device of the invention is that illustrated in FIG. 1 wherein the indicator is comprised of: blue-colored partially polymerized 5,7-dodecadiyn-1,12-diol bis(butoxycarbonylmethylurethane), 4DBCMU, as indicating solid; barrier material of polyethylene, preferably low density, polycarbonate or nylon; and wherein the vapor is aqueous ethanol, preferably 50:50 or 25:75 ethanol:water volume percentages.

Figure 6:
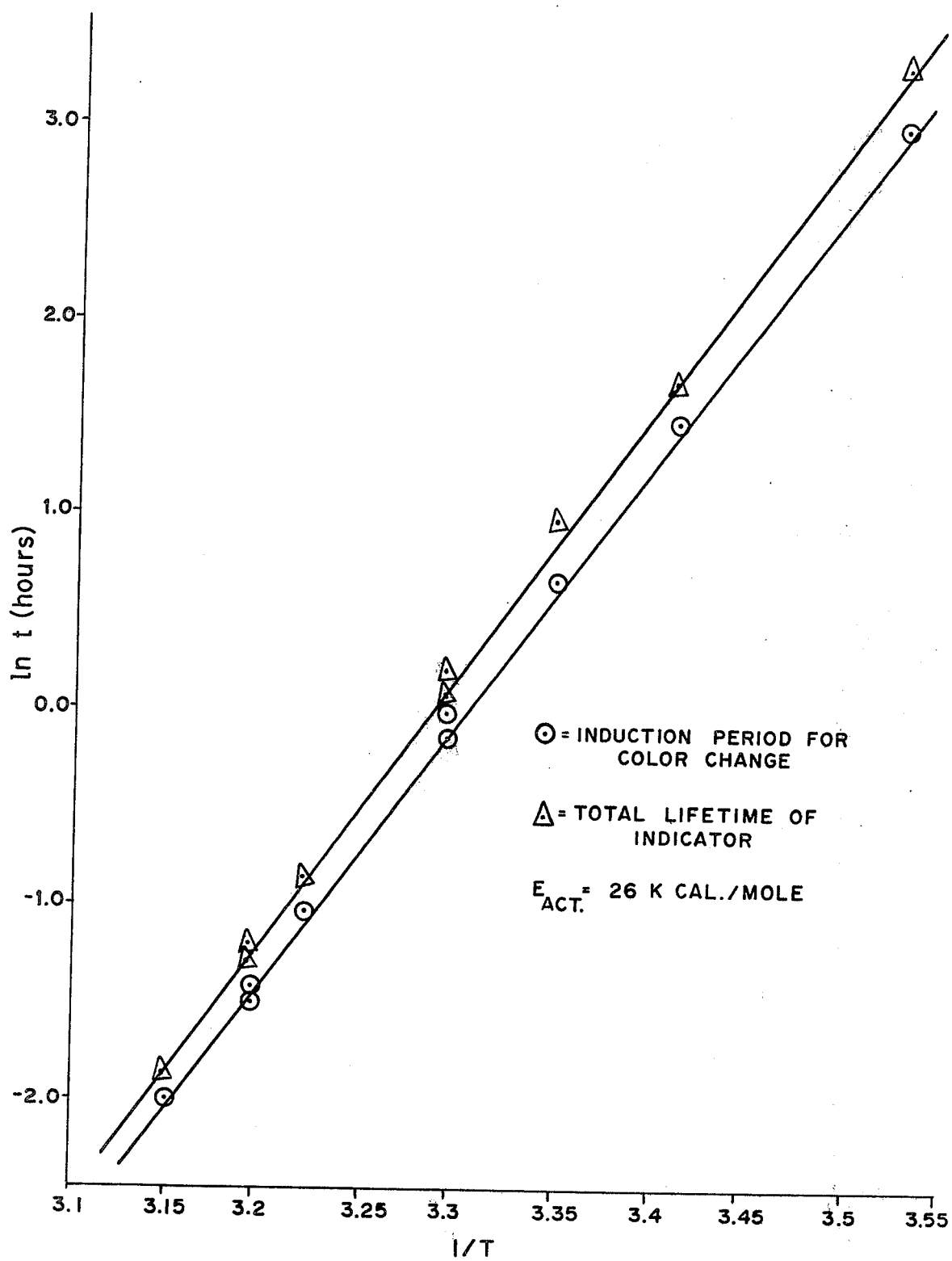
FIG. 6 is a plot of ln t (in hours) vs. $1/(1000 \cdot T)°K$ for the device of Example 5, comprised of partially polymerized 2,4-hexadiyn-1,6-diol bis(n-butylurethane) (HDDBU) indicator/3.5 mil thick polyethylene barrier/acetone vapor, for values of the induction period and total lifetime. The activation energy, $E_{act.}$, is calculated from the slope of both experimentally derived curves.

The energy of activation of the device, $E_{act.}$, can be calculated by measuring the induction period or the total life-time of the device during operation at two or more temperatures. The energy of activation of the device is a measure of the change in rate (i.e., rate of color change or development in the present devices) with temperature. The natural logarithm of induction period, ($\ln t$) is the ordinate, is plotted versus $1/T$ (reciprocal of the absolute temperature during device operation) as the abscissa and the energy of activation is calculated from the slope of the resulting straight line plots, by known methods in the art. For example, as illustrated in FIG. 6, the energy of activation of the partially polymerized HDDnBU/polyethylene barrier-/acetone vapor device system of Example 5 is calculated to be 26 kcal./mole. In general, devices having higher energies of activation, will undergo color responses at relatively greater rates, at higher temperatures, than lower temperatures as compared to devices having lower activation energies.

Also provided in the instant invention is a process for monitoring the time-temperature history of an article comprising applying to the article the device of the invention and providing vapor to contact the indicator at the beginning of the monitoring period. The device contains an attaching means, preferably an adhesive backing, by which it can be readily attached to an article to be monitored. Means for providing vapor to the device are discussed hereinabove and can be a frangible solvent reservoir. The monitoring process can be conducted at a temperature of about $-70°$ to $+150°$ C.; at atmospheric pressures and even at reduced pressures in partial vacuum.

Also a part of the instant invention is an article having the device of the invention, as described herein, attached thereto.

A process for making the device of this invention is also included as a part of the instant invention and comprises enclosing in a vapor-impermeable container:

(a) a vapor-permeable barrier;

(b) means for providing vapor at a given moment to the container, said means positioned on one side of the barrier; and (c) an indicator, capable of exhibiting a visual color response upon contacting said vapor, said indicator positioned on the other side of the barrier, whereby the barrier creates an induction period between the moment the vapor is introduced to said container and the moment said indicator exhibits the color response.

The nature of the container, barrier, indicator, vapor and means for providing vapor to the device are fully and adequately described hereinabove. As described in Example 1, the indicating tab can be prepared by contacting the substrate with a solution of the indicating solid and allowing the solvent to evaporate. Alternately, the indicating solid may be dispersed in a medium such as a binder and applied to the substrate. The indicating tab can then be sealed in a barrier material such as a polymer, by means of a sealer, such as a hot press sealer, glues and pressure sensitive adhesives. Preferred is a hot press sealer. The other components of the device, including the solvent reservoir 7 (containing solvent) and absorptive supports 8 and 9, are also sealed in the container by means of the sealer to form the completed device.

The following examples are illustrative of the best mode of carrying out the invention, as contemplated by us, but should not be construed to be limitations on the scope or spirit of the instant invention. Parts are by weight where given unless otherwise indicated.

EXAMPLE 1

PREPARATION OF THE DEVICE

A device similar to that illustrated in FIG. 3 and FIG. 4 was prepared except that four (4) sealed indicator tabs were employed and a solvent capsule was not utilized. Each sealed tab contained a different partially polymerized diacetylene and was prepared by coating a 0.6 by 0.6 centimeter square of Whatman No. 1 type filter paper with diacetylene monomer. The coating was accomplished by dissolving 1 gram of the diacetylene in 20 ml of solvent, spraying the resulting solution onto the square of filter paper and allowing the solvent to evaporate. The coated diacetylene monomer was then partially polymerized by treating with ultraviolet radiation at room temperature. The resulting partially polymerized diacetylene was blue in color. Each tab of partially polymerized diacetylene was then sealed in a piece of 3.5 mil thick low-density polyethylene film, which acts as the barrier polymer, resulting in about a 0.8 by 0.8 centimeter square sealed indicator tab. The resulting tabs were placed in a row onto a 1.0 by 4.0 centimeter piece of thick filter paper, which was wetted with acetone (replacing the need for a solvent capsule) and the resulting assembly was then sealed into a 2 mil thick piece type polyester (polyethylene terephthalate) to form a 1.5 by 5 centimeter rectangular outer envelope container. The sealing of the tabs and of the outer envelope was accomplished by a heat sealer. The starting time for monitoring a time-temperature history, i.e., the start of the measurement, was taken as the moment the outer envelope was completely sealed. The threshold time required for a visually observable color change in an indicator to develop, i.e., the "color response", is referred to as the "induction period". The values of the induction periods for different indicator tabs were determined in the device systems and are listed below in Table 1. The visual color response that was noted was a change in color from blue-to-red and thus the start and completion of the color change and the length of the induction period were readily ascertainable. The total lifetime of the indicator tab, i.e., the total time required for the indicator in the tab to completely undergo the color change from start to finish, in this case from blue to red, was also visually determined, at about 25° C. Diacetylene monomers of the formula R—C≡C—C≡C—R, having the R groups listed below, were used for preparing the partially polymerized diacetylene of each indicator tab as listed below in Table 1, together with the respective induction periods and total lifetime periods.

TABLE 1

System:

| | | |
|---|---|---|
| | Indicator: | Different partially polymerized diacetylenes |
| | Vapor: | Acetone |
| | Barrier Polymer: | 3.5 mil thick polyethylene |
| | Temperature: | Room temperature (25° C.) |

Results:

| Partially Polymerized Diacetylene | R group | Induction Period (hrs) | Total Lifetime (hrs) |
|---|---|---|---|
| HDDnBU | —CH$_2$—O—CO—NH—(CH$_2$)$_3$—CH$_3$ | 2.1 | 2.5 |
| 4DBCMU | —(CH$_2$)$_4$—O—CO—NH—CH$_2$—O—CO—(CH$_2$)$_3$CH$_3$ | 2.4 | 2.75 |
| 4D$_n$HU | —(CH$_2$)$_4$—O—CO—NH—(CH$_2$)$_5$—CH$_3$ | 4.3 | 5.25 |
| 4D$_n$BU | —(CH$_2$)$_4$—O—CO—NH—(CH$_2$)$_3$—CH$_3$ | 10 | 19 |

EXAMPLE 2

EFFECT OF COMPOSITION OF THE BARRIER POLYMER ON THE INDUCTION PERIOD

The device used in this example was constructed essentially the same as described in Example 1 except that only two sealed indicator tabs were utilized. One sealed tab was constructed using 3.5 mil thick polyethylene as barrier polymer and the other, using 2.0 mil thick polyester. Partially polymerized HDDBU, containing about one weight percent polymer was the indicator and the vapor utilized was chloroform. The sealed indicator tabs, as in Example 1, were placed onto a filter paper, which was wetted with acetone and the assembly was quickly sealed with a 5 mil thick outer nylon container. Results of the color development are tabulated below in Table 2.

TABLE 2

System:

| | | |
|---|---|---|
| | Indicator: | Partially polymerized HDDnBU |
| | Vapor: | Chloroform |
| | Temperature: | Room temperature |

Results:

| Barrier Polymer | Film Thickness (mil) | Induction Period (min.) | Total Lifetime (min.) |
|---|---|---|---|
| Polyethylene | 3.5 | 6.0 | 6.7 |
| Polyester | 2.0 | 40 | 43 |

As is seen from the data, polyester provides for a longer induction period than polyethylene, probably due to the slower rate of permeation of solvent through polyester film.

EXAMPLE 3

EFFECT OF BARRIER POLYMER THICKNESS ON INDUCTION PERIOD

The device used in this example was the same as described in Example 1 except three indicator tabs, containing partially polymerized HDDnBU were used. These indicator tabs were sealed in polyethylene films of 3.5 mil, 7.0 mil and 10.5 mil thicknesses. As in Example 1, the sealed indicator tabs were placed onto a filter paper, which was wetted with acetone, and the assembly sealed in an outer envelope. The induction period and total lifetime of each sealed indicator tab was then measured. The results are given below in Table 3.

TABLE 3

System:

| | | |
|---|---|---|
| | Indicator: | Partially polymerized HDDnBU |
| | Vapor: | Acetone |
| | Barrier: Polymer: | Polethylene |
| | Polymer Thickness: | Varied |
| | Temperature: | Room temperature |

Results:

| Thickness (mil) | Induction Period (hrs.) | Total Lifetime (hrs.) |
|---|---|---|
| 3.5 | 3.0 | 3.5 |
| 7.0 | 5.5 | 6.25 |
| 10.5 | 8.0 | 9.5 |

As is seen from the above data, use of thicker barrier polymer films increases both the induction period and the total lifetime of the indicator tab.

EXAMPLE 4

EFFECT OF NATURE OF VAPOR ON THE INDUCTION PERIOD AND THE TOTAL LIFETIME OF THE INDICATOR

Four devices were prepared in this example, each device similar to that illustrated in FIGS. 1 and 2. Each sealed indicator tab contained partially polymerized HDDnBU as the indicator, but in each case a different vapor was used to activate the color response. Each indicator tab was enclosed in 3.5 mil thick polyethylene barrier polymer and placed onto a piece of filter paper wetted with a solvent, as listed below in Table 4. The color development was carried out at 30° C. and the results are tabulated below in Table 4.

TABLE 4

System:
- Indicator: Partially polymerized HDDnBU
- Vapor: Varied
- Barrier Polymer: 3.5 mil polyethylene
- Temperature: 30° C.

Results:

| Vapor | Induction Period (hrs.) | Total Lifetime (hrs.) |
|---|---|---|
| Chloroform | 0.066 | 0.075 |
| Acetone | 0.83 | 1.03 |
| p-dioxane | 1.15 | 1.4 |
| Dimethyl formamide | 15 | 18 |

As is seen from the data, chloroform yielded an induction period which was 1/250th of that of the device containing dimethylformamide.

EXAMPLE 5

EFFECT OF TEMPERATURE ON THE INDUCTION PERIOD AND TOTAL LIFETIME OF THE INDICATOR TAB AND CALCULATION OF ACTIVATION ENERGY

Seven devices were prepared in this example, each device being identical and similar to that illustrated in FIGS. 1 and 2. Each sealed indicator tab contained partially polymerized HDDBU and was constructed from 3.5 mil thick polyethylene barrier polymer. The devices were subjected to seven different temperatures varying from 10° to 44° C. The induction periods and total lifetime periods, measured for each device, are listed below in Table 5.

TABLE 5

System:
- Indicator: Partially polymerized HHDnBU
- Vapor: Acetone
- Barrier Polymer: 3.5 mil thick polyethylene
- Temperature: Varied Results:

| Temperature (°C.) | Induction Period (hrs.) | Total Lifetime (hrs.) |
|---|---|---|
| 10 | 18.5 | 25.0 |
| 20 | 3.83 | 5.0 |
| 25.4 | 1.83 | 2.33 |
| 30.6 | 0.83 | 1.03 |
| 37.0 | 0.35 | 0.45 |
| 39.9 | 0.22 | 0.27 |

TABLE 5-continued

| 44.0 | 0.12 | 0.15 |
|---|---|---|

As is seen in the above Table, an increase in temperature results in a corresponding decrease in the length of the induction period and total lifetime for a sealed indicator tab. By plotting ln(t), where t is the induction time or total lifetime of the device, versus $1/T°K.$, where T is the absolute temperature at which the measurement is conducted, a straight line plot was obtained where the slope is proportional to the activation energy, $E_{act.}$. For the partially polymerized HDDnBU/polyethylene/acetone device, this energy was calculated to be 26 kcal/mole, as illustrated in FIG. 6. (Note—the good approximation of the experimental points to straight line curves in each case indicates self-consistency among the measurements.)

EXAMPLE 6

EFFECT OF DIFFERENT VAPORS ON THE ACTIVATION ENERGY OF THE DEVICE

Four devices were employed in this example, which were essentially identical to the devices used in Example 5. Each device contained a sealed indicator tab containing partially polymerized HDDBU, enclosed in a 3.5 mil thick square of polyethylene. Each sealed indicator tab was placed onto a filter paper, which was wetted with a different solvent, and the assembly was then sealed in a sheet of nylon to form an outer envelope. The induction periods and total lifetimes were measured at different temperatures for each device. Activation energy was then determined by plotting ln t vs. $1/T °K.$ for each measurement set. The obtained straight line plots were similar to those obtained in FIG. 6. The activation energy for each device was then calculated from the plotted data. The results are tabulated below in Table 6.

TABLE 6

System:
- Indicator: Partially polymerized HDDnBU
- Vapor: Varied
- Barrier Polymer: 3.5 mil thick polyethylene
- Temperature: Varied Results:

| Vapor | Activation Energy (kcal/mole) |
|---|---|
| Chloroform | 16.5 |
| p-dioxane | 27.5 |
| Acetone | 26 |
| Dimethyl Formamide | 29 |

As is seen from the above data, the activation energy of a device can be significantly altered by a change in the nature of the vapor used.

EXAMPLE 7

PERMEATION t-T INDICATORS WITH TWO SEPARATE COLOR CHANGES

This device differs from that used in Example 6 in that it contains partially polymerized 4DBCMU as the indicating solid, sealed in 3.5 and 7.0 mil thick polyethylene film. The sealed indicator tab was contacted with chloroform vapor at room temperature. Two resulting color transitions were observed, the first a blue-red transition, and the second a red-yellow transition. The induction period for each color change as a function of the thickness of the polyethylene film was determined. The results are listed below in Table 7.

TABLE 7

System:
- Indicator: Partially polymerized 4DBCMU
- Vapor: Chloroform
- Barrier Polymer: Polyethylene
- Temperature: Room temperature

| Thickness (mil) | First Induction Period (mins), Blue → Red | Second Induction Period (mins) Red → Yellow |
|---|---|---|
| 3.5 | 3.0–3.3 | 7–8 |
| 7.0 | 9–10 | 17–18 |

As is seen from the above Table, the thicker polyethylene barrier resulted in longer induction periods. The first color change occurred with the partially polymerized diacetylene in the solid state and is thought to be due to the extraction of monomer from the partially polymerized polymer. The second color change which occurred is thought to be due to the dissolution of the remaining polymer in the condensed vapor.

EXAMPLE 8

INACTIVE PHASE PERMEATION t-T INDICATOR

The device used in this Example was similar to that of Example 1, except four sealed indicator tabs were used, composed of barrier films of different thickness and material, each sealed indicator tab containing an inactive form of HDDmTU. The colorless inactive monomer phase was found to rearrange into an active monomer phase when contacted with p-dioxane vapor. Once formed, the active phase polymerizes rapidly to a blue color, which response can serve as the end-point in the monitoring process. The induction period was determined as a function of the thickness and type of barrier polymer. Results are summarized below in Table 8.

TABLE 8

System:
- Indicator: Inactive HDDmTU
- Vapor: p-dioxane
- Barrier Polymer: Varied
- Temperature: Room temperature

| Polymer | Thickness (mil) | Induction Period (hrs) colorless → blue |
|---|---|---|
| Polyethylene | 3.5 | 2 → 2.5 |
| " | 7.0 | 4.5 → 5.5 |
| " | 10.5 | 7.5 → 8.5 |
| Polyester | 2.0 | 240 → 260 |

As is seen above, the induction period required for inactive HDDmTU to be converted to the active form, capable of undergoing a color change upon polymerization, varies with the thickness of the particular polymer film. In general, polyethylene yields shorter induction periods than does polyester.

EXAMPLE 9

USE OF A DYE AS THE COLOR INDICATOR

A device similar to that of Example 1 was utilized except that a dye, ethyl violet, was used as the indicator and the sealed tab was constructed from 3.5 mil polyethylene film and subjected to the action of chloroform vapor at room temperature. The induction period was found to be 8 minutes and the total lifetime, 16 minutes. The dye, ethyl violet was green-gold in the solid state and turned bluish-violet when contacted with chloroform vapor, presumably as a result of dissolution in the condensed vapor.

EXAMPLE 10

USE OF A SOLID HAVING HIGH VAPOR PRESSURE AS SOURCE OF VAPOR

The device used was similar to that of Example 1, except different polymers with varying thicknesses were used as the polymer barriers. Also, the source of vapor used was a low melting solid, p-cresol, having a melting point of 33° C. The indicator used was partially polymerized HDDnBU, which was deposited on filter paper and sealed in a polyamide envelope to form the sealed indicator tabs. Results are given below in Table 9.

TABLE 9

System:
- Indicator: Partially polymerized HDDnBU
- Vapor: p-Cresol
- Barrier Polymer: Varied
- Temperature: Room temperature

| Polymer | Thickness (mil) | Induction Period (hrs.) | Total Lifetime (hrs.) |
|---|---|---|---|
| Polyethylene | 3.5 | 77 | 94 |
| " | 7.0 | 175 | 200 |
| " | 10.5 | 198 | 240 |
| Polyester | 2.0 | 240 | 270 |

As seen in the above Example, the devices of the present invention can be constructed using the vapors of solids.

EXAMPLE 11

DOUBLE BARRIER PERMEATION t-T INDICATOR

The device used in this example is similar to that illustrated in FIG. 3, having side view of FIG. 5, except that four indicator tabs containing partially polymerized HDDnBU enclosed in different polymers of varying thicknesses were employed. The means for providing solvent vapor consisted of solvent wetted paper 10 enclosed in a solvent permeable polymer envelope 11 as illustrated in FIG. 5. Alternately, frangible reservoir 7 could also be employed. In this example, p-dioxane solvent was used and the solvent-wetted filter paper was enclosed in a 2 mil polyester envelope. The entire system was then sealed in an outer 5 mil thick nylon envelope. The measured induction period (time for the indicator to develop a red color) and total lifetime of the device are listed below in Table 10.

TABLE 10

System:
- Indicator: Partially polymerized HDDnBU
- Vapor: p-Dioxane
- Solvent reservoir: 2 Mil thick polyester
- Barrier polymer: Polyethylene
- Temperature: Room temperature

| Polymer | Thickness (mil) | Induction Period (days) | Total Lifetime (days) |
|---|---|---|---|
| Polyethylene | 3.5 | 19 | 22 |
| " | 7.0 | 20 | 24 |

TABLE 10-continued

| | | | |
|---|---|---|---|
| " | 10.5 | 24 | 30 |

EXAMPLE 12

PERMEATION t-T INDICATOR WHERE THE POLYMER BARRIER ENCLOSES THE SOLVENT RESERVOIR

The device used in this example is similar to that illustrated in FIG. 5, except that the individual indicator tabs were not sealed in polymer barriers (symbol 4 in FIG. 5). However, the induction period in this device, as in the device of Example 11, is created by the polymer envelope containing the source of vapor. In this Example, various partially polymerized diacetylenes, as indicators, were deposited on filter paper squares, placed onto a filter support, which in turn rested on a 3 mil thick polyethylene reservoir containing filter paper wetted with acetone. Acetone vapor permeating through the reservoir polymer container activated the device. The results, which were observed at room temperature, are given below in Table 11.

TABLE 11

System:
Indicator: Various partially polymerized diacetylenes
Vapor: Acetone
Barrier Polymer
(Solvent envelope): 3 Mil polyester
Temperature: Room temperature

| Partially polymerized Diacetylene | Induction Period | Total Lifetime |
|---|---|---|
| HDDnBU | 5 hrs. 10 mins. | 8 hrs. |
| 4DBCMU | 8 hrs. | |
| 4DnHU | 24 hrs. | 30 hrs. |
| 4DnBU | 24 hrs. | |

EXAMPLE 13

SOLVENT PERMEATION t-T INDICATOR USING FULLY POLYMERIZED POLYMER AS INDICATING SOLID

In this Example, a device similar to that illustrated in FIGS. 3 and 4 was used except that three sealed indicator tabs were employed, each containing a fully polymerized diacetylene polymer, encased in a polymer barrier of varying thickness and composition. The indicator used was poly4DBCMU, prepared by polymerizing 4DBCMU monomer with 50 Mrad of cobalt-60 gamma radiation. The vapor used was chloroform. The indicator exhibited two color changes and induction periods upon contact with this vapor, as listed below.

TABLE 12

System:
Indicator: Poly 4DBCMU
Vapor: Chloroform
Barrier Polymer: Polyethylene and polyester
Temperature: Room temperature

| Polymer | Thickness (mil) | First Induction Period (Metallic to Red) | Second Induction Period (Red to Yellow) |
|---|---|---|---|
| Polyethylene | 2 | 1.25–1.50 mins. | 2.5–3.5 mins. |
| " | 6 | 4.5–13.5 mins. | 18–21.5 mins. |
| Polyester | 2 | 61–65 mins. | 80–87 mins. |

As is seen above, the indicator underwent a color change from metallic green—gold to red, with a characteristic induction period for the system, and a second color change from red-to-yellow, thought to be due to the dissolution of the red polymer in the condensed vapor.

EXAMPLE 14

USE OF ETHANOL AND AQUEOUS ETHANOL AS VAPOR

The device used in this example was similar to that of Example 1 except that different polymers of varying thicknesses were used as the polymer barriers. The source of vapor was either ethanol or aqueous ethanol as listed. The indicator used as partially polymerized 4DBCMU and device operation was conducted at 35.0° C. Results are given below in Table 13.

TABLE 13

System:
Indicator: Partially polymerized 4DBCMU
Vapor: Varied
Barrier Polymer: Varied
Temperature: 35.0° C.

| Polymer | Thickness (mil) | Vapor (volume:volume %) | Total Lifetime |
|---|---|---|---|
| Polycarbonate[a] | 1.0 | ethanol | 1.5 days |
| " | " | ethanol:water (25:75) | 1.5 hours |
| Nylon | 4.0 | ethanol:water (50:50) | 44 minutes |
| " | " | ethanol:water (25:75) | 1 day |

[a]"Carbonex" type of polycarbonate from Cloudslee Co.

I claim:
1. A device for monitoring the time-temperature history of an article comprising:
   (a) a closed vapor-impermeable container;
   (b) at least one vapor-permeable barrier within said container;
   (c) vapor capable of permeating through the permeable barrier;
   (d) means for providing vapor at a given moment to said container, said means positioned on one side of the barrier; and
   (e) at least one indicator, comprised of a solid deposited on a substrate, capable of exhibiting a visual color response upon contact with said vapor, said indicator positioned on the other side of the barrier, whereby the barrier creates an induction period between the moment the vapor is introduced to said container and the moment said indicator exhibits the color response and wherein said indicator undergoes a color response over its entire exposed surface substantially simultaneously.

2. The device of claim 1 wherein said container is constructed of a vapor-impermeable polymer.

3. The device of claim 1 wherein said barrier is an enclosed compartment containing the indicator.

4. The device of claim 3 further comprising a plurality of barriers, being enclosed compartments, each containing an indicator, and each compartment differing in overall permeability.

5. The device of claim 1 wherein the barrier is constructed of a vapor-permeable polymer which is insoluble in said vapor during monitoring.

6. The device of claim 5 wherein said polymer is polyethylene, polypropylene, polycarbonate, polystyrene, cellophane, cellulose acetate, nylon-6, nylon-66, nylon-610, polyacrylonitrile, polyvinylalcohol, polyoxymethylene, polyvinylchloride, polyvinylidene chloride, polytrifluorochloroethylene, polymethylmethacrylate, polyethylene terephthalate, copolymers and equivalents thereof.

7. The device of claim 1 wherein said vapor in the condensed liquid state has a boiling point of at least about 25° C. at atmospheric pressure.

8. The device of claim 7 wherein said vapor is a $C_3$-$C_6$ alkyl ketone, halogenated $C_1$-$C_4$ alkane, containing 1 to 4 halogen atoms, $C_3$-$C_6$ N,N-dialkylalkanoamide, $C_1$-$C_3$ monohydric alkyl alcohol, $C_1$-$C_4$ saturated alkanoic monocarboxylic acid, or lower alkyl ester thereof, $C_1$-$C_4$ nitroalkane, $C_2$-$C_6$ alkyl sulfoxide, $C_2$-$C_6$ alkyl ether, cyclic $C_4$-$C_6$ alkyl ether, $C_7$-$C_9$ alkylphenol, $C_5$-$C_{10}$ heterocyclic nitrogen compound, phenol, water, equivalents or mixtures thereof.

9. The device of claim 8 wherein said vapor is acetone, methyl ethyl ketone, dichloromethane, chloroform, carbon tetrachloride, dimethyl sulfoxide, N,N-dimethylformamide, N,N-dimethylacetamide, methanol, ethanol, aqueous ethanol, isopropanol, acetic acid, water, p-dioxane, p-cresol, phenol, pyridine, ethyl acetate, nitromethane, dimethylsulfoxide equivalents, or mixtures thereof.

10. The device of claim 1 wherein said solid is a diacetylene compound, or mixture thereof, containing at least one —C≡C—C≡C—group per molecule.

11. The device of claim 10 wherein said diacetylene compound contains at least one urethane substituent.

12. The device of claim 10 wherein said diacetylene compound is selected from the group consisting of 5,7-dodecadiyn-1,12-diol bis (butoxycarbonylmethylurethane), 5,7 dodecadiyn-1,12-diol bis(n-hexylurethane, 5,7-dodecadiyn-1,12-diol (bis(n-butylurethane) and 2,4-hexadiyn-1,6-diol bis(butylurethane).

13. The device of claim 10 wherein said diacetylene compound, or mixture thereof, is partially polymerized and is a mixture containing up to about 10 weight percent polyacetylene.

14. The device of claim 10 wherein said solid further comprises a mixture of solids wherein the visual color change of the mixture is different from the color changes of the individual solids upon contacting said vapor.

15. The device of claim 14 wherein the mixture of solids contains a diacetylene compound and a solid selected from the group consisting of dyes, pigments or mixtures thereof.

16. The device of claim 5 wherein said solid is in an inactive form, not capable of undergoing a color response upon thermal annealing, but capable of undergoing conversion to an active form upon contacting a vapor.

17. The device of claim 16 wherein said solid is 2,4-hexadiyn-1,6-diol bis (m-tolylurethane), 2,4-hexadiyn-1,6-diol bis (o-methoxyphenylurethane), 2,4-hexadiyn-1,6-diol bis (p-chlorophenylurethane), 2,4-hexadiyn-1,6-diol bis (o-chlorophenylurethane), or mixtures thereof, and said vapor is p-dioxane, dimethylformamide, pyridine, or mixtures thereof.

18. The device of claim 1 wherein said vapor-permeable barrier is polyethylene, polycarbonate or nylon, said indicator comprises 5,7-dodecadiyn-1,12-diol bis)butoxycarbonylmethylurethane) and said vapor is aqueous ethanol.

19. A process for monitoring the time-temperature history of an article comprising applying to the article the device of claim 1 and providing vapor to contact an indicator at the beginning of the monitoring.

20. A process for preparing the device of claim 1 comprising the step of enclosing in a vapor-impermeable container a:
(a) vapor-permeable barrier;
(b) means for providing vapor at a given moment to the container, said means positioned on one side of the barrier and,
(c) an indicator, comprised of a solid deposited on a substrate, capable of exhibiting a visual color response upon contacting said vapor, said indicator positioned on the other side of the barrier, whereby the barrier creates an induction period between the moment the vapor is introduced to said container and the moment said indicator exhibits the color response.

* * * * *

UNITED STATES PATENT AND TRADEMARK OFFICE
CERTIFICATE OF CORRECTION

PATENT NO. : 4,195,056
DATED : March 25, 1980
INVENTOR(S) : G. N. Patel

It is certified that error appears in the above-identified patent and that said Letters Patent are hereby corrected as shown below:

Col. 7, line 37, after "by", insert --weight--.

Col. 7, line 65, "undergo to change" should read --undergo a change--.

Col. 11, line 63, "HDDBU" should read -- HDDnBU--.

Col. 12, Table 3, "Polethylene" should read --Polyethylene--.

Col. 13, line 47, "HDDBU" should read --HDDnBU--.

Col. 13, Table 5, "HHDnBU" should read --HDDnBU--.

Col. 14, lines 13-14, "polyethlene" should read --polyethylene--.

Col. 14, line 26, "HDDBU" should read --HDDnBU--.

Col. 18, line 13, "used as partially" should read --used was partially--.

Col. 19, line 33, after "5,7" insert a dash; and "bis(n-hexylurethane," should read --bis(n-hexylurethane),--.

UNITED STATES PATENT AND TRADEMARK OFFICE
CERTIFICATE OF CORRECTION

PATENT NO. : 4,195,056

DATED : March 25, 1980

INVENTOR(S) : G. N. Patel

It is certified that error appears in the above-identified patent and that said Letters Patent are hereby corrected as shown below:

Col. 19, line 34, "(bis(n-butylurethane)" should read --bis(n-butylurethane)--.

Col. 20, line 21, "bis)butox-" should read --bis(butox- --

Signed and Sealed this

First Day of July 1980

[SEAL]

Attest:

SIDNEY A. DIAMOND

Attesting Officer     Commissioner of Patents and Trademarks